(12) United States Patent
Lee et al.

(10) Patent No.: US 12,128,657 B2
(45) Date of Patent: Oct. 29, 2024

(54) DISPLAY DEVICE

(71) Applicant: Samsung Display Co., Ltd., Yongin-si (KR)

(72) Inventors: Hyoung-Jin Lee, Cheonan-si (KR); Yonggi Ko, Asan-si (KR); Myoungan Min, Cheonan-si (KR); Hyeji Jang, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 303 days.

(21) Appl. No.: 17/344,249

(22) Filed: Jun. 10, 2021

(65) Prior Publication Data

US 2022/0072841 A1    Mar. 10, 2022

(30) Foreign Application Priority Data

Sep. 7, 2020   (KR) ........................ 10-2020-0113975

(51) Int. Cl.
| | |
|---|---|
| *B32B 27/40* | (2006.01) |
| *B32B 5/18* | (2006.01) |
| *B32B 27/08* | (2006.01) |
| *G06F 1/16* | (2006.01) |

(52) U.S. Cl.
CPC ............... *B32B 27/40* (2013.01); *B32B 5/18* (2013.01); *B32B 27/08* (2013.01); *G06F 1/1652* (2013.01); *B32B 2266/10* (2016.11); *B32B 2307/51* (2013.01); *B32B 2307/56* (2013.01); *B32B 2307/722* (2013.01); *B32B 2375/00* (2013.01); *B32B 2457/20* (2013.01)

(58) Field of Classification Search
CPC ........... B32B 5/18; B32B 27/40; B32B 27/08; B32B 2266/10; B32B 2307/51; B32B 2307/56; B32B 2307/722; B32B 2375/00; B32B 2457/20; G06F 1/1652
See application file for complete search history.

(56) References Cited

U.S. PATENT DOCUMENTS

| | | |
|---|---|---|
| 10,083,636 B2 | 9/2018 | Han |
| 2016/0236382 A1* | 8/2016 | Lee .................... B29C 44/08 |
| 2017/0135197 A1* | 5/2017 | Huitema ............. H05K 1/0353 |
| 2017/0260425 A1* | 9/2017 | Yamamoto ............. B32B 27/34 |
| 2018/0122830 A1 | 5/2018 | Kachatryan et al. |

FOREIGN PATENT DOCUMENTS

| | | |
|---|---|---|
| JP | 6262999 | 1/2018 |
| KR | 10-1004426 | 12/2010 |
| KR | 10-1485781 | 1/2015 |
| KR | 10-1832301 | 2/2018 |
| KR | 10-2018-0021299 | 3/2018 |
| KR | 10-2018-0046422 | 5/2018 |

* cited by examiner

*Primary Examiner* — Alicia J Weydemeyer
*Assistant Examiner* — Laura B Figg
(74) *Attorney, Agent, or Firm* — KILE PARK REED & HOUTTEMAN PLLC (57) ABSTRACT

A display device includes a display panel and a cushion layer disposed below the display panel. The cushion layer includes a first foam layer having a first density, a second foam layer disposed above the first foam layer and having a second density less than the first density, and a third foam layer disposed above the second foam layer and having a third density greater than the first density. The third form layer is disposed closer to the display panel than the first foam layer. The display device provides improved surface quality, impact resistance, and restoration properties.

17 Claims, 6 Drawing Sheets

DISPLAY DEVICE

CROSS-REFERENCE TO RELATED APPLICATION(S)

This application claims priority to and benefits of Korean Patent Application No. 10-2020-0113975 under 35 U.S.C. § 119, filed on Sep. 7, 2020 in the Korean Intellectual Property Office, the entire contents of which are hereby incorporated by reference.

BACKGROUND

1. Technical Field

The disclosure herein relates to a display device, and more particularly, to a display device including a foam layer.

2. Description of the Related Art

Display devices display various images on a display screen to provide information to users. Typically, display devices display information within an allotted screen. The display devices may be used in order to display images on various electronic devices such as smartphones, laptop computers, and television sets.

In recent years, flexible display devices including a flexible display panel have been developed. The flexible display devices, unlike rigid display devices, are foldable, rollable, or bendable. The flexible display devices that are deformable into various shapes allow easy portability and enhance user friendliness.

However, the flexible display devices may have drawbacks such as irregularities in a folding area and/or visibility of the irregularities. Thus, there has been a demand for the development of a technology to overcome the drawbacks and limitations of the flexible display devices.

SUMMARY

The disclosure provides a display device having improved surface quality and improved impact resistance by including multiple foam layers, each of which may have different densities.

An embodiment provides a display device that may include a display panel and a cushion layer disposed below the display panel. The cushion layer may include a first foam layer which may have a first density, a second foam layer which may be disposed above the first foam layer and may have a second density less than the first density, and a third foam layer positioned closer to the display panel than the first foam layer, disposed above the second foam layer. The third foam layer may have a third density greater than the first density.

The first density may be in a range of about 0.5 g/cm$^3$ to about 0.7 g/cm$^3$, the second density may be in a range of about 0 g/cm$^3$ to about 0.2 g/cm$^3$, and the third density may be in a range of about 0.8 g/cm$^3$ to about 0.9 g/cm$^3$.

Each of the first foam layer and the third foam layer may have a smaller thickness than the second foam layer.

Each of the first foam layer and the third foam layer may have a thickness of about 80 μm to about 120 μm.

The first foam layer, the second foam layer, and the third foam layer may include polyurethane.

The display device may further include a first skin layer disposed on a lower surface of the first foam layer, a second skin layer disposed on an upper surface of the first foam layer, a third skin layer disposed on a lower surface of the third foam layer, and a fourth skin layer disposed on an upper surface of the third foam layer.

The first skin layer, the second skin layer, the third skin layer, and the fourth skin layer may include polyurethane.

The second foam layer may be directly disposed above the second skin layer, and the third skin layer may be directly disposed above the second foam layer.

In an embodiment, a display device may include a display panel and a cushion layer disposed below the display panel. The cushion layer may a first foam layer having first pores, a second foam layer disposed above the first foam layer and having second pores, and a third foam layer disposed above the second foam layer and having third pores. A porosity of the first foam layer may be less than a porosity of the second foam layer and may be greater than a porosity of the third foam layer.

The third foam layer may be disposed closer to the display panel than the first foam layer.

The first foam layer may be disposed closer to the display panel than the third foam layer.

At least part of the first pores may be connected to each other to form a first pore assembly, and the third pores may be spaced apart from each other.

At least part of the first pores may be connected to each other. At least part of the second pores may be connected to each other. A ratio of a number of the second pores connected to each other to a total number of the second pores may be greater than a ratio of a number of the first pores connected to each other to a total number of the first pores.

The first foam layer may have a porosity in a range of about 20% to about 60%, the second foam layer may have a porosity in a range of about 90% to about 99%, and the third foam layer may have a porosity in a range of about 5% to about 15%.

A size of the first pore assembly may be greater than a size of each of the third pores.

In an embodiment, a display device may include a display panel and a cushion layer displayed below the display panel. The cushion layer may include a first foam layer which may include first pores having a semi-closed cell type structure, a second foam layer disposed above the first foam layer and including second pores having an open cell type structure, and a third foam layer disposed above the second foam layer including third pores having a closed cell type structure. The third foam layer may be disposed closer to the display panel than the first foam layer.

The display panel may be foldable with respect to a virtual folding axis extending in a first direction.

The display device may comprise a first support and a second support that are disposed below the display panel and spaced apart from each other in a second direction perpendicular to the first direction. The cushion layer may be disposed between the display panel and the support.

BRIEF DESCRIPTION OF THE DRAWINGS

The accompanying drawings are included to provide a further understanding of the embodiments, and are incorporated in and constitute a part of this specification. The drawings illustrate embodiments and, together with the description, serve to explain principles of the embodiments. In the drawings.

DETAILED DESCRIPTION OF THE EMBODIMENTS

In the specification, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The term "and/or," includes all combinations of one or more of which associated configurations may define.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of embodiments. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

Unless otherwise defined, all terms (including technical and scientific terms) used herein have the same meaning as commonly understood by one of ordinary skill in the art to which the embodiments pertain. It is also to be understood that terms defined in commonly used dictionaries should be interpreted as having meanings consistent with the meanings in the context of the related art, and are expressly defined herein unless they are interpreted in an ideal or overly formal sense.

It should be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, a display device according to an embodiment will be described with reference to the accompanying drawings.

Figure 1:
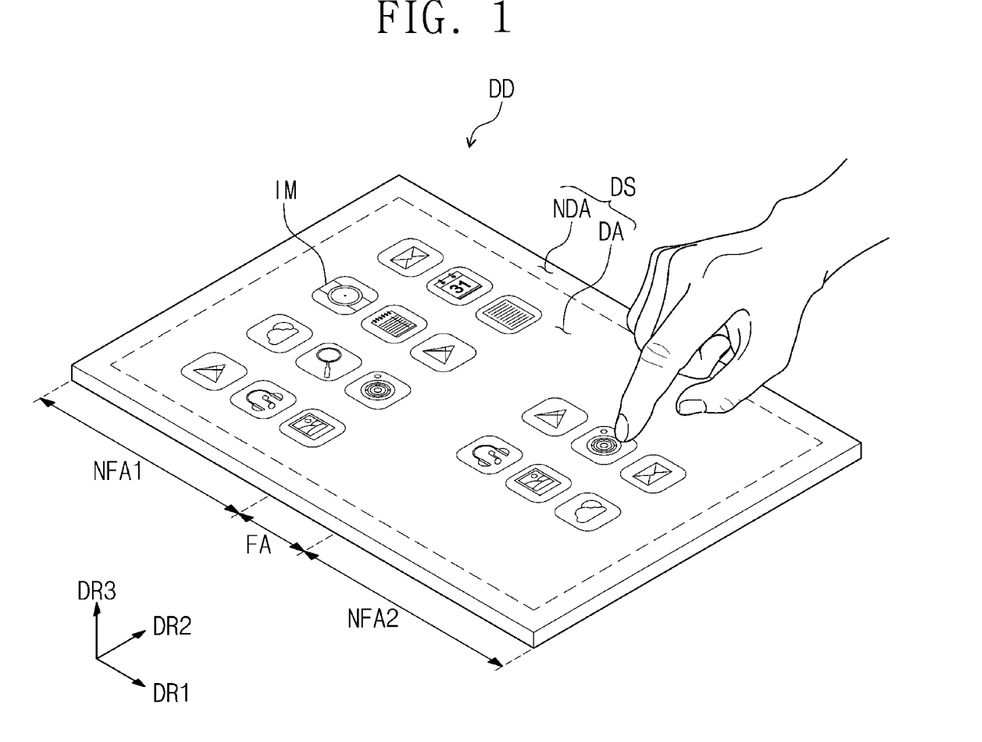
FIG. 1 is a schematic perspective view of a display device according to an embodiment.
Figure 2:
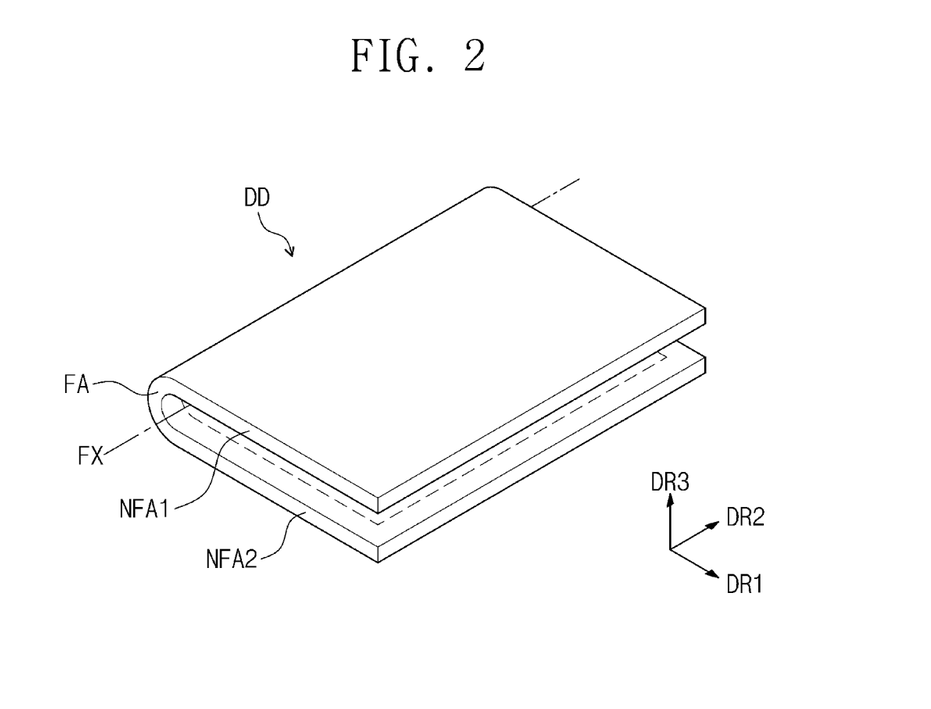
FIG. 2 is a schematic view illustrating the display device of FIG. 1 in a folded state.

FIG. 1 is a schematic perspective view of a display device according to an embodiment. FIG. 2 is a schematic view illustrating the display device of FIG. 1 in a folded state.

Referring to FIG. 1, a display device DD according to an embodiment may have a rectangular shape which has long sides extending in a first direction DR1 and short sides extending in a second direction DR2 intersecting the first direction DR1. However, the embodiments are not limited thereto, and the display device DD may have various shapes such as a circular or a polygonal shape. The display device DD may be a flexible display device DD.

Hereinafter, a direction substantially perpendicular to a plane defined by the first direction DR1 and the second direction DR2 is defined as a third direction DR3. In the specification, "in a plan view" may be defined as viewed from the third direction DR3.

The display device DD may include a first non-folding area NFA1, a second non-folding area NFA2, and a folding area FA disposed between the first non-folding area NFA1 and the second non-folding area NFA2. The first non-folding area NFA1, the folding area FA, and the second non-folding area NFA2 may be sequentially arranged in the first direction DR1.

A folding area FA and two non-folding areas NFA1 and NFA2 are illustrated, but the number of the folding area FA and the non-folding areas NFA1 and NFA2 is not limited thereto. For example, the display device DD may include two or more non-folding areas and folding areas disposed between the non-folding areas.

An upper surface of the display device DD may be defined as a display surface DS, and may have a plane defined by the first direction DR1 and the second direction DR2. Images IM generated in the display device DD may be provided to users through the display surface DS.

The display surface DS may include a display area DA and a non-display area NDA around the display area DA. The display area DA may display an image, and the non-display area NDA may not display an image. The non-display area NDA may surround the display area DA and define an edge of the display device DD, which may be printed in a color.

Referring to FIG. 2, the display device DD may be a foldable display device DD which is folded or unfolded. For example, the display device DD may be folded with respect to a virtual folding axis FX extending in the second direction DR2. The folding axis FX may be defined as an axis parallel to the short sides of the display device DD.

When the display device DD is folded with respect to the folding axis, an upper surface of the first non-folding area NFA1 and an upper surface of the second non-folding area NFA2 may face each other. Accordingly, the display device DD may be in-folded such that the display surface DS is not exposed to the outside.

In the embodiment, the display device DD is described to be folded with respect to the folding axis extending in the second direction DR2, but the embodiment is not limited thereto. The display device DD may be folded in different shapes. For example, the display device DD may be folded with respect to a folding axis extending in the first direction DR1.

Figure 3:
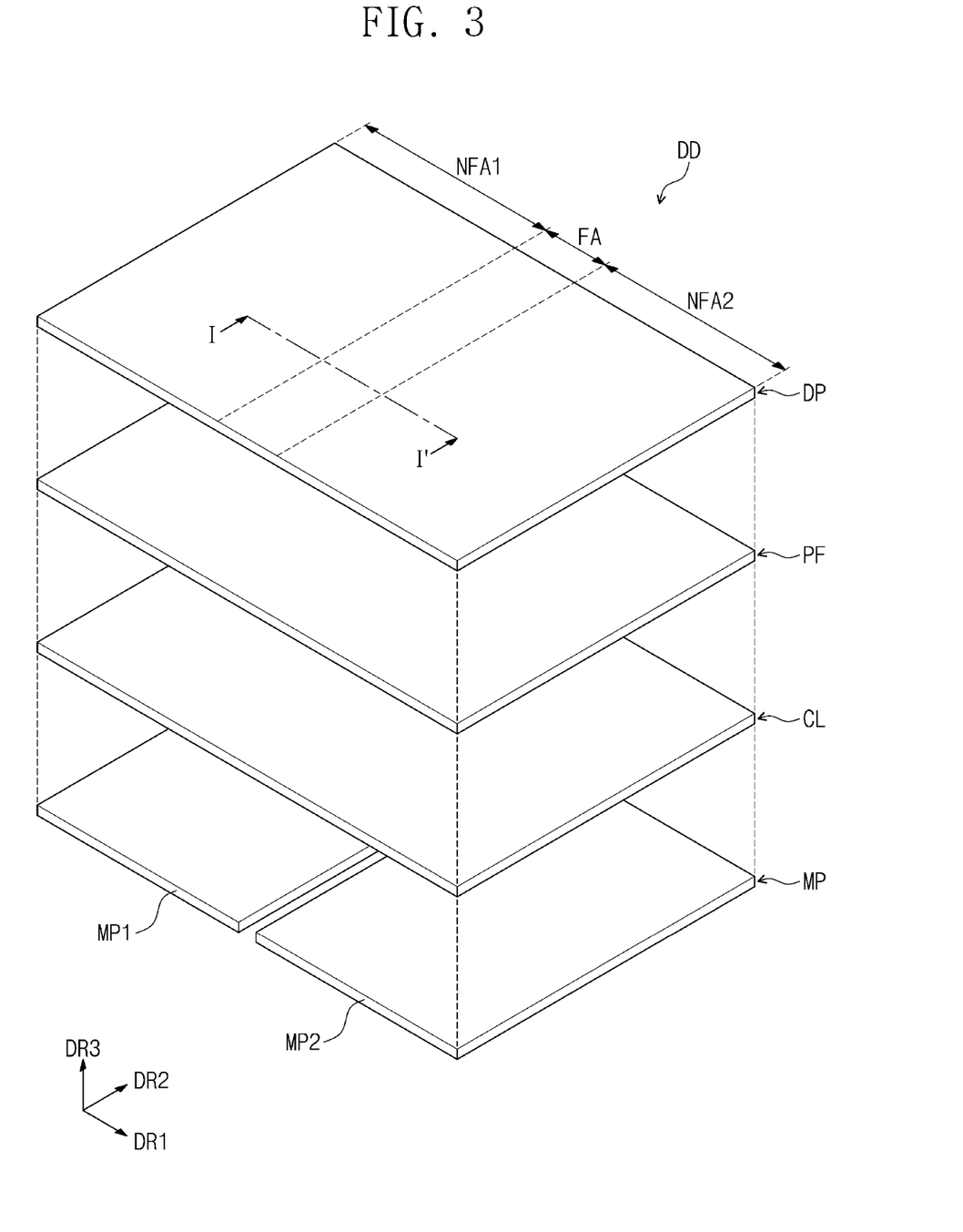
FIG. 3 is an exploded schematic perspective view of a display device according to an embodiment.
Figure 4:
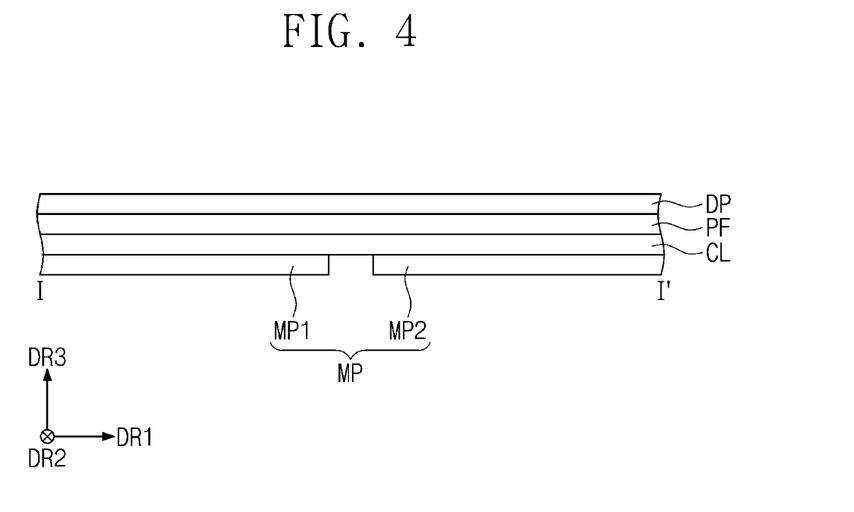
FIG. 4 is a schematic cross-sectional view of a display device taken along line I-I' of FIG. 3.

FIG. 3 is an exploded schematic perspective view of a display device according to an embodiment. FIG. 4 is a schematic cross-sectional view of a display device taken along line I-I' of FIG. 3.

Referring to FIGS. 3 and 4, the display device DD according to an embodiment may include a display panel DP, a protective film PF, a cushion layer CL, and a support MP.

The display device DP may have a rectangular shape which has long sides extending in the first direction DR1 and short sides extending in the second direction DR2. The display panel DP may include a first non-folding area NFA1, a second non-folding area NFA2, and a folding area FA disposed between the first non-folding area NFA1 and the second non-folding area NFA2. The first non-folding area NFA1, the second non-folding area NFA2, and the folding area FA may be sequentially arranged in the first direction DR1. The display panel DP may be a flexible display panel DP. For example, the folding area FA of the display panel DP may be folded with respect to the folding axis FX (refer to FIG. 2). The protective film PF supporting the display panel DP may be included below the display panel DP.

The support MP may be disposed below the display panel DP. The support MP may have sufficient rigidity to support the display panel DP. For example, the support MP may include a metallic material.

The support MP may include a first support MP1 and a second support MP2. The first support MP1 and the second support MP2 may be rigid substrates. The first support MP1 may be disposed to overlap portions of the first non-folding area NFA1 and the folding area FA. The second support MP2 may be disposed to overlap portions of the second non-folding area NFA2 and the folding area FA. In a plan view, the first support MP1 and the second support MP2 may have a rectangular shape.

The second support MP2 may be spaced apart from the first support MP1 in the first direction DR1. Accordingly, a gap may be provided between the first support MP1 and the second support MP2. The gap formed between the first support MP1 and the second support MP2 may overlap the folding area FA.

An adhesive (not shown) may be disposed between the support MP and the display panel DP. For example, the adhesive may be a pressure sensitive adhesive. However, the type of the adhesive is not limited thereto. The adhesive may be disposed between the first support MP1 and the first non-folding area NFA1, and between the second support M2 and the second non-folding area FA2.

The protective film PF may be disposed below the display panel DP to protect the display panel DP. The protective film PF may include a flexible resin. For example, the protective film PF may include polyethylene terephthalate (PET).

The cushion layer CL may be disposed between the support MP and a protective layer PF. The cushion layer CL may overlap the overall display panel DP, thereby reducing irregularities that are visible through the display surface of the display panel DP at a portion where the first support MP1 and the second support MP2 are spaced apart from each other. The cushion layer CL may protect the display panel DP from external impact. The cushion layer CL will be described in detail in FIG. 5.

Figure 5:
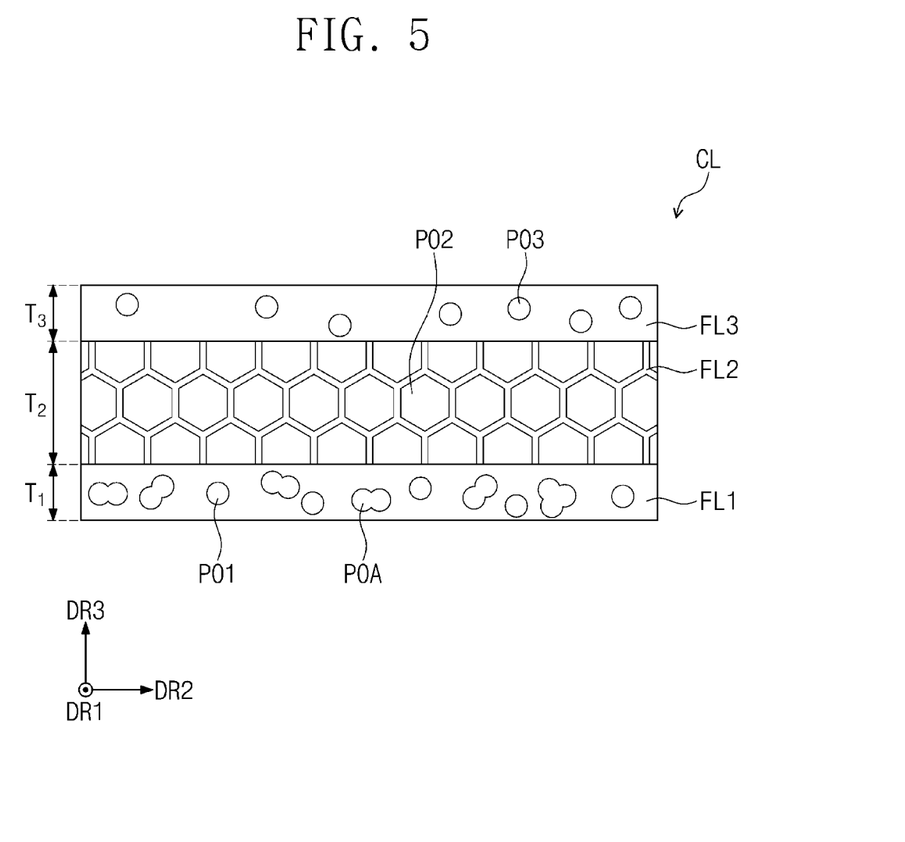
FIG. 5 is an enlarged schematic cross-sectional view of a cushion layer included in a display device according to an embodiment.
Figure 6:
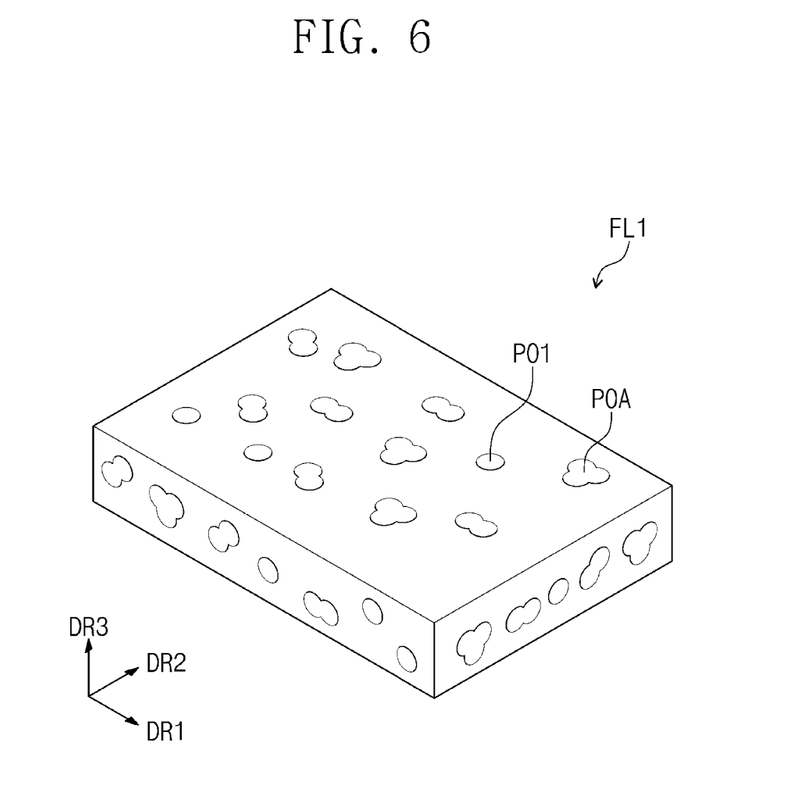
FIG. 6 is a schematic perspective view of a first foam layer included in a display device according to an embodiment.
Figure 7A:
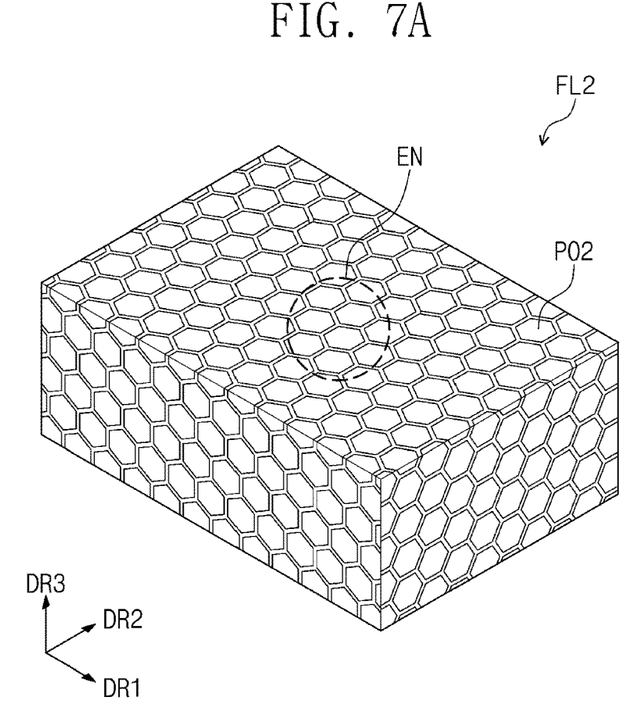
FIG. 7A is a schematic perspective view of a second foam layer included in a display device according to an embodiment.
Figure 7B:
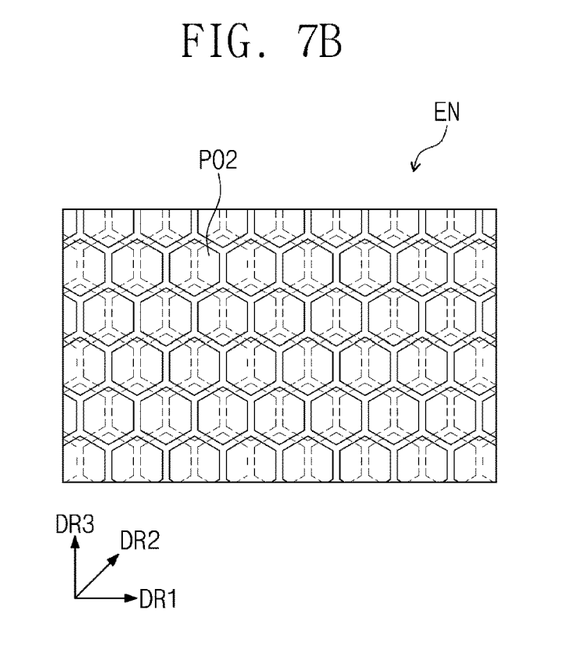
FIG. 7B is an enlarged schematic view of a portion of a second foam layer included in a display device according to an embodiment.
Figure 8:
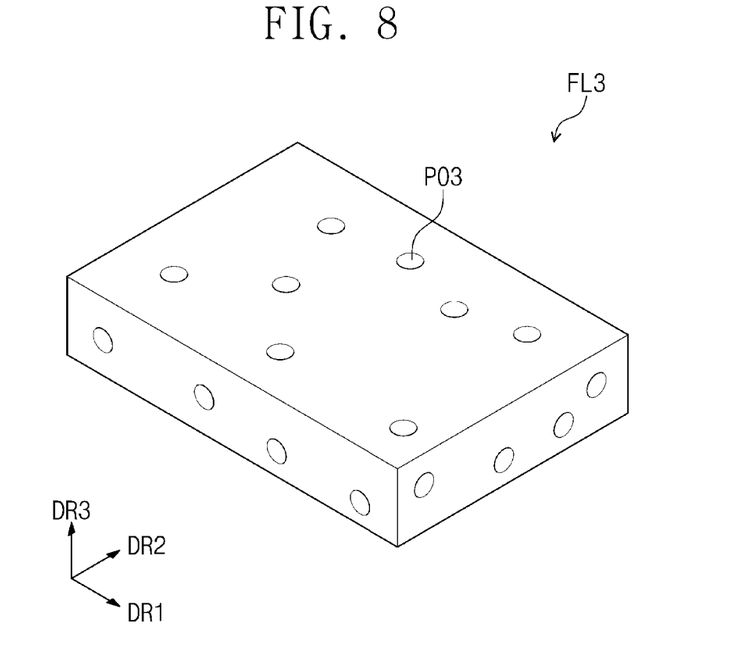
FIG. 8 is a schematic perspective view of a third foam layer included in a display device according to an embodiment.

FIG. 5 is an enlarged schematic cross-sectional view of a cushion layer included in a display device of an embodiment. FIG. 6 is a schematic perspective view of a first foam layer. FIG. 7A is a schematic perspective view of a second foam layer. FIG. 7B is an enlarged schematic view of a portion of the second foam layer. FIG. 8 is a schematic perspective view of a third foam layer. Hereinafter, a display device of an embodiment will be described in detail with reference to FIGS. 5 to 8.

Referring to FIGS. 5 to 8, in an embodiment, the cushion layer CL may include a first foam layer FL1, a second foam layer FL2 disposed above the first foam layer FL1, and a third foam layer FL3 disposed above the layer FL2. The first foam layer FL1, the second foam layer FL2, and the third foam layer FL3 may include polyurethane.

The first foam layer FL1 may have a first density, the second foam layer FL2 may have a second density less than the first density, and the third foam layer FL3 may have a third density greater than the first density. The first density may be in a range of about 0.5 g/cm³ to about 0.7 g/cm³, the second density may be in a range of about 0 g/cm³ to about 0.2 g/cm³, and the third density may be in a range of about 0.8 g/cm³ to about 0.9 g/cm³.

Among the foam layers FL1, FL2, and FL3 included in the cushion layer CL, the third foam layer FL3 may be disposed closest to the display panel DP. Thus, the third foam layer FL3 may be disposed closer to the display panel DP than the first foam layer FL1. However, the embodiments are not limited thereto, and in an embodiment, among the foam layers FL1, FL2, and FL3 included in the cushion layer CL, the first foam layer FL1 may be disposed closest to the display panel DP. The first foam layer FL1 may be disposed closer to the display panel DP than the third foam layer FL3.

The third foam layer FL3 having high density may reduce irregularities that may be visible on the surface of the display panel DP, but there may be a limitation in protecting the display panel DP from external impact due to poor compression and restoration properties when the external impact is applied. The first foam layer FL1 and the second foam layer FL2 with less density may have improved compression and restoration properties, and the display panel DP may thus be protected from external impact. However, the first foam layer FL1 and the second foam layer FL2 are not capable of preventing the irregularities from becoming visible on the surface of the display panel DP. The second foam layer FL2 has low durability, thereby having high chances of being torn. The cushion layer CL of the embodiment includes the first foam layer FL1, the second foam layer FL2, and the third foam layer FL3 together. In the embodiment, all these layers, each having different densities, may be included together, thereby reducing the irregularities visible on the surface of the display panel DP while protecting the display panel DP from external impact.

The first foam layer FL1 may have a first thickness $T_1$, the second foam layer FL2 may have a second thickness $T_2$, and the third foam layer FL3 may have a third thickness $T_3$. The first thickness $T_1$ and the third thickness $T_3$ each may be smaller than the second thickness $T_2$. The first thickness $T_1$ and the third thickness $T_3$ may each independently be in a range from about 80 μm to about 120 μm. For example, the first thickness $T_1$ may be smaller than the third thickness $T_3$, the first thickness $T_1$ may be greater than the third thickness $T_3$, or the first thickness $T_1$ may be the same as the third thickness.

The first foam layer FL1 may include first pores PO1, the second foam layer FL2 may include second pores PO2, and the third foam layer FL3 may include third pores PO3. The first pores PO1 and the third pores PO3 may be closed type pores in which air is filled inside, and the second pores PO2 may be open type pores through which air passes.

The volume occupied by the first pores PO1 with respect to the total volume of the first foam layer FL1 may be smaller than the volume occupied by the second pores PO2 with respect to the total volume of the second foam layer FL2, and may be larger than the volume occupied by the third pores PO3 with respect to the total volume of the foam layer FL3.

The porosity of the first foam layer FL1 may be smaller than the porosity of the second foam layer FL2, and greater than the porosity of the third foam layer FL3. The first foam layer FL1 may have a porosity in a range of about 20% to about 60%, the second foam layer FL2 may have a porosity in a range of about 90% to about 99%, and the third foam layer FL3 may have a porosity in a range of about 5% to about 15%. The greater the porosity, the lower the durability, but the greater the restoration properties, and the smaller the porosity, the higher the density, and the better the surface properties, but the higher the vulnerability to external impact. The display device DD of an embodiment including foam layers FL1, FL2, and FL3 each having different porosities and may thus provide a display device having improved restoration, surface, and durability properties.

Some of the first pores PO1 may be connected to each other. In the specification, the pores are defined to be connected when air may pass between the pores from one pore to another. Some of the first pores PO1 may be connected to each other to form a pore assembly POA. Most of the second pores PO2 may be connected to each other. The ratio of the number of connected second pores PO2 with respect to the total number of the second pores PO2 may be greater than the ratio of the number of connected first pores PO1 with respect to the total number of the first pores PO1. The third pores PO3 may be spaced apart from each other. Each of the third pores PO3 may be smaller in size than the pore assembly POA. The foam layer may have improved impact resistance and restoration properties when the ratio of the connected pores to the pores as a whole increases. That is, the first foam layer FL1 has better impact resistance and restoration properties than the third foam layer FL3, and the second foam layer FL2 has better impact resistance and restoration properties than the first foam layer FL1.

The first pores PO1 may have a semi-closed cell type structure in which some of the pores are connected to each other and external air may not be introduced into the pores. The second pores PO2 may have an open cell type structure in which most of the pores are connected and external air may be introduced. The third pores PO3 may have a closed cell type structure in which the pores are spaced apart from each other and external air may not be introduced. The second foam layer FL2 may allow external air to be introduced into the second pores PO2, thereby having superior restoration and impact resistance properties to the first pores PO1 and the third pores PO3.

Referring to FIGS. 6 and 8, the first pores PO1 and the third pores PO3 may have circular shaped cross-sections. The first pores PO1 and the third pores PO3 may have spherical three-dimensional shapes. However, the embodiments are not limited thereto, and the structure of the foam layer is not limited as long as the structure may serve a shock absorbing function. For example, the pores of the foam layer each may have an oval, polygonal, or irregular shaped cross-sections.

Referring to FIGS. 7A and 7B, the second pores PO2 may have hexagonal shaped cross-sections. The second pores PO2 may have a hexagonal column shape in three dimensions. However, the embodiments are not limited thereto, and the structure of the foam layer is not limited as long as the structure may serve a shock absorbing function. For example, the pores of the foam layer each may have an oval, polygonal, or irregular shaped cross section.

The second pores PO2 may be regularly arranged at regular intervals. However, the embodiments are not limited thereto, and each of the pores may be randomly disposed in the second foam layer FL2.

The second pores PO2 may have an open shape without upper and lower surfaces. Referring to FIG. 7B, the second pores PO2 positioned at the front surface are indicated with solid lines and the second pores PO2 positioned at the rear surface are indicated with dotted lines. The second pores PO2 may be open pores, and thus the pores positioned at the rear surface may be exposed through the pores positioned at the front surface.

Figure 9:
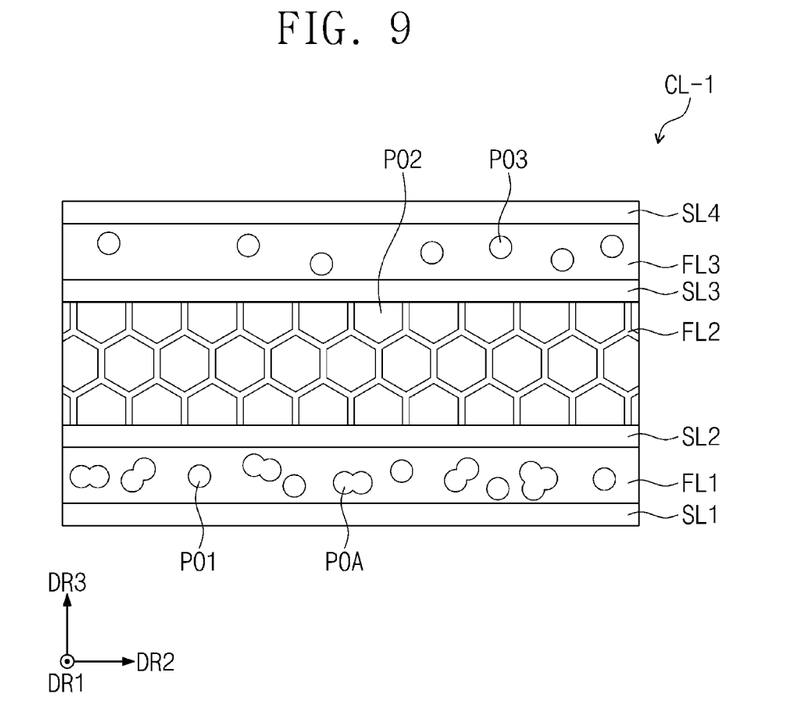
FIG. 9 is an enlarged schematic cross-sectional view of a cushion layer included in a display device according to an embodiment.

FIG. 9 is an enlarged schematic cross-sectional view of a cushion layer included in an embodiment of a display device. Hereinafter, a cushion layer CL-1 included in a display device of an embodiment will be described in detail with reference to FIG. 9. The same details as those described above with reference to FIGS. 1 to 8 are not repeated, and the differences will be mainly described.

Referring to FIG. 9, the cushion layer CL-1 according to an embodiment may include a first skin layer SL1 disposed on a lower surface of the first foam layer FL1, a second skin layer SL2 disposed on an upper surface of the first foam layer FL1, a third skin layer SL3 disposed on a lower surface of the third foam layer FL3, and a fourth skin layer SL4 disposed on an upper surface of the third foam layer FL3.

The first skin layer SL1, the second skin layer SL2, the third skin layer SL3, and the fourth skin layer SL4 may include polyurethane. For example, the first skin layer SL1, the second skin layer SL2, the third skin layer SL3, and the fourth skin layer SL4 may include thermoplastic polyurethane.

The thickness of each of the skin layers SL1, SL2, SL3 and SL4 may be smaller than the thickness of each of the foam layers FL1, FL2, and FL3. The thickness of each of the skin layers SL1, SL2, SL3, and SL4 is shown to be the same, but the embodiments are not limited thereto, and the thicknesses of the skin layers SL1, SL2, SL3, and SL4 may each be different.

Although not shown, the cushion layer CL-1 may be formed by injecting a resin forming the first foam layer FL1 between the first skin layer SL1 and the second skin layer SL2 respectively prepared to form a first foam layer FL1, injecting a resin forming the third foam layer FL3 between the third skin layer SL3 and the fourth skin layer SL4 respectively prepared to form a third foam layer FL3, and injecting a resin forming the second foam layer FL2 between the second skin layer SL2 and the third skin layer SL3 to form a second foam layer FL2. That is, the second foam layer FL2 may be directly disposed on the second skin layer SL2 without an adhesive layer. The third foam layer FL3 may be directly disposed on the third skin layer SL3 without an adhesive layer.

According to an embodiment, a display device having improved surface quality, impact resistance, and restoration properties may be provided by including three foam layers, each having different densities, porosities, and arrangements of pores, below the display panel.

A display device according to an embodiment includes multiple foam layers, each having different densities, thereby exhibiting improved surface, impact resistance, and restoration properties.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:
   a display panel; and
   a cushion layer disposed below the display panel,
   wherein the cushion layer includes:
      a first foam layer having a first density;
      a second foam layer disposed above the first foam layer and having a second density less than the first density; and
      a third foam layer disposed closer to the display panel than the first foam layer and disposed above the second foam layer, the third foam layer having a third density greater than the first density wherein
      each of the first foam layer and the third foam layer has a smaller thickness than the second foam layer.

2. The display device of claim 1, wherein
   the first density is in a range of about 0.5 g/cm$^3$ to about 0.7 g/cm$^3$,
   the second density is in a range of about 0 g/cm$^3$ to about 0.2 g/cm$^3$, and
   the third density is in a range of about 0.8 g/cm$^3$ to about 0.9 g/cm$^3$.

3. The display device of claim 1, wherein each of the first foam layer and the third foam layer has a thickness in a range of about 80 μm to about 120 μm.

4. The display device of claim 1, wherein the first foam layer, the second foam layer, and the third foam layer comprise polyurethane.

5. The display device of claim 1, further comprising:
   a first skin layer disposed on a lower surface of the first foam layer;
   a second skin layer disposed on an upper surface of the first foam layer;
   a third skin layer disposed on a lower surface of the third foam layer; and
   a fourth skin layer disposed on an upper surface of the third foam layer.

6. The display device of claim 5, wherein the first skin layer, the second skin layer, the third skin layer, and the fourth skin layer comprise polyurethane.

7. The display device of claim 5, wherein:
   the second foam layer is directly disposed above the second skin layer; and
   the third skin layer is directly disposed above the second foam layer.

8. A display device comprising:
   a display panel; and
   a cushion layer disposed below the display panel, wherein the cushion layer includes:
      a first foam layer including a plurality of first pores;
      a second foam layer disposed above the first foam layer and including a plurality of second pores; and
      a third foam layer disposed above the second foam layer and including a plurality of third pores, and
      a porosity of the first foam layer is less than a porosity of the second foam layer and is greater than a porosity of the third foam layer.

9. The display device of claim 8, wherein the third foam layer is disposed closer to the display panel than the first foam layer.

10. The display device of claim 8, wherein the first foam layer is disposed closer to the display panel than the third foam layer.

11. The display device of claim 8, wherein
    at least part of the plurality of first pores are connected to each other to form a first pore assembly, and
    the plurality of third pores are spaced apart from each other.

12. The display device of claim 8, wherein:
    at least part of the plurality of first pores are connected to each other,
    at least part of the plurality of second pores are connected to each other, and
    a ratio of a number of the plurality of second pores connected to each other to a total number of the plurality of second pores is greater than a ratio of a number of the plurality of first pores connected to each other to a total number of the plurality of first pores.

13. The display device of claim 8, wherein:
    the first foam layer has a porosity in a range of about 20% to about 60%;
    the second foam layer has a porosity in a range of about 90% to about 99%; and
    the third foam layer has a porosity in a range of about 5% to about 15%.

14. The display device of claim 11, wherein a size of the first pore assembly is greater than a size of each of the third pores.

15. A display device comprising:
    a display panel; and
    a cushion layer displayed below the display panel,
    wherein the cushion layer includes:
       a first foam layer including a plurality of first pores having a semi-closed cell type structure;
       a second foam layer disposed above the first foam layer and including a plurality of second pores, the plurality of second pores having an open cell type structure; and
       a third foam layer disposed above the second foam layer and including a plurality of third pores, the plurality of third pores having a closed cell type structure, and the third foam layer disposed closer to the display panel than the first foam layer.

16. The display device of claim 15, wherein the display panel is foldable with respect to a virtual folding axis extending in a first direction.

17. The display device of claim 16, wherein
    the display device comprises a support including a first support and a second support that are disposed below the display panel and spaced apart from each other in a second direction perpendicular to the first direction, and
    the cushion layer is disposed between the display panel and the support.

* * * * *